United States Patent
Greenfield et al.

(10) Patent No.: US 10,480,790 B2
(45) Date of Patent: Nov. 19, 2019

(54) FLANGE BENDING SUPPORT

(71) Applicant: Delavan Inc., West Des Moines, IA (US)

(72) Inventors: Jacob Greenfield, Granger, IA (US); Dustin Andrew Borror, Norwalk, IA (US); Mark A. Caples, Ankeny, IA (US)

(73) Assignee: Delavan Inc., West Des Moines, IA (US)

( * ) Notice: Subject to any disclaimer, the term of this patent is extended or adjusted under 35 U.S.C. 154(b) by 0 days.

(21) Appl. No.: 15/789,610

(22) Filed: Oct. 20, 2017

(65) Prior Publication Data

US 2019/0120490 A1   Apr. 25, 2019

(51) Int. Cl.
| | |
|---|---|
| *F23R 3/28* | (2006.01) |
| *F02M 37/00* | (2006.01) |
| *F02C 7/22* | (2006.01) |
| *B05B 15/62* | (2018.01) |

(52) U.S. Cl.
CPC .............. *F23R 3/283* (2013.01); *B05B 15/62* (2018.02); *F02C 7/22* (2013.01); *F02M 37/0017* (2013.01); *F23R 2900/00005* (2013.01); *F23R 2900/00012* (2013.01); *F23R 2900/00017* (2013.01)

(58) Field of Classification Search
CPC . F23R 3/283; F23R 3/28; B05B 15/62; B05B 15/60
USPC ....... 239/282, 283, 560, 561, 273–279, 584; 169/66–68
See application file for complete search history.

(56) References Cited

U.S. PATENT DOCUMENTS

| | | | |
|---|---|---|---|
| 3,398,529 A | | 8/1968 | Schmitz et al. |
| 5,988,531 A | * | 11/1999 | Maden .................. F23D 11/106 239/406 |
| 2010/0071666 A1 | | 3/2010 | Lee et al. |

FOREIGN PATENT DOCUMENTS

| | | |
|---|---|---|
| EP | 1887270 A1 | 2/2008 |
| EP | 2375164 A2 | 10/2011 |
| JP | H0849795 A | 2/1996 |

OTHER PUBLICATIONS

Extended European Search Report dated Feb. 14, 2019, issued during the prosecution of European Patent Application No. EP 18201544.6 (9 pages).

* cited by examiner

*Primary Examiner* — Christopher S Kim
(74) *Attorney, Agent, or Firm* — Locke Lord LLP; Scott D. Wofsy; Joshua L. Jones

(57) ABSTRACT

An injector includes a mounting flange having a mounting lug with fastener bore therethrough that passes through the mounting flange. A support beam extends along an outer surface of the mounting flange from the mounting lug to a hub of the mounting flange. The support beam includes an outer surface spaced apart from the outer surface of the mounting flange and two opposed lateral surfaces each extending from the outer surface of the support beam toward the outer surface of the mounting flange. The outer surface of the support beam includes a contour and/or the support beam includes a stiffening beam that is wider than the width between the opposed lateral surfaces of the support beam.

10 Claims, 2 Drawing Sheets

FLANGE BENDING SUPPORT

BACKGROUND OF THE INVENTION

1. Field of the Invention

The present disclosure relates to nozzles and injectors, and more particularly to mounting nozzles and injectors such as in gas turbine engines.

2. Description of Related Art

Injectors and nozzles are often used to clamp components of air shrouds and seals when installing the nozzles in engine cases of gas turbine engines. Using nozzles to clamp these other components leaves a gap between the mounting flange of the nozzle and the engine case. This gap allows the mounting flange to bend and to be subjected to mechanical stress when the bolts are torqued to mount the nozzle to the engine case. This mechanical stress and bending can cause cracking, which must be corrected by replacing the nozzle.

The conventional techniques have been considered satisfactory for their intended purpose. However, there is an ever present need for improved flange bending support. This disclosure provides a solution for this need.

SUMMARY OF THE INVENTION

An injector includes a mounting flange and a feed arm extending from an inner surface of the mounting flange. A spray nozzle extends from an end of the feed arm opposite the mounting flange. The mounting flange includes at least one inlet fitting in fluid communication with one or more respective fluid passages through the feed arm. The spray nozzle is in fluid communication with the one or more respective fluid passages for issuing a spray of fluid supplied from the at least one inlet fitting. The mounting flange includes a first mounting lug with a fastener bore therethrough that passes through the mounting flange. A first support beam extends along an outer surface of the mounting flange from the first mounting lug to a hub of the mounting flange. The first support beam includes an outer surface spaced apart from the outer surface of the mounting flange and two opposed lateral surfaces each extending from the outer surface of the first support beam toward the outer surface of the mounting flange. The outer surface of the first support beam includes a contour with a blended radius that extends along a majority of the length from the first mounting lug to the hub for mitigating mechanical stresses at the first mounting lug.

A second mounting lug can be included with a fastener bore therethrough that passes through the mounting flange. A second support beam can extend along the outer surface of the mounting flange from the second mounting lug to the hub of the mounting flange. The second support beam can include an outer surface spaced apart from the outer surface of the mounting flange and two opposed lateral surfaces each extending from the outer surface of the second support beam toward the outer surface of the mounting flange. The outer surface of the second support beam can include a contour with a blended radius for mitigating mechanical stresses at the second mounting lug. The first and second lugs can be diametrically opposed to one another across the hub of the mounting flange.

An engine case can be mounted to the mounting flange by two fasteners fastened through the fastener bores of the first and second mounting lugs. There can be a pocket defined between the engine case and the inner surface of the mounting flange. A gasket can be seated in the pocket sealing between the inner surface of the mounting flange and the engine case. An injector shroud can extend through the engine case around the feed arm and can be captured in the pocket.

The support beam can include a stiffening beam extending from the lateral surfaces of the support beam to the outer surface of the mounting flange, wherein the stiffening beam is wider than the width between the opposed lateral surfaces of the support beam. The contour of the outer surface of the first support beam can be tangent with an outer surface of the first mounting lug. The outer surface of the first support beam can include a flat portion extending from the hub to the contour. The contour can meet the flat portion of the outer surface of the support beam at a non-tangential angle. Over 75% of the outer surface of the support beam can be included in the contour, and under 25% of the outer surface of the support beam can be included in the flat portion.

A method of installing an injector in an engine case includes tightening a fastener passing through a mounting lug of a mounting flange on an injector to fasten the injector to an engine case. There is a gasket and a shroud compressed by an inner surface of the mounting flange in a pocket of the engine case, wherein tightening the fastener loads the mounting flange without causing failure because the mounting flange is supported by a support beam extending from a hub of the mounting flange to the mounting lug. The support beam has at least one of an outer surface with a contour extending along a majority of the length from the first mounting lug to the hub for mitigating mechanical stresses at the mounting lug and/or a stiffening beam extending from opposed lateral surfaces of the support beam to an outer surface of the mounting flange wherein the stiffening beam is wider than the width between the opposed lateral surfaces. Tightening a fastener can include tightening two fasteners into two diametrically opposed mounting lugs of the mounting flange, wherein a support beam as recited in claim 11 extends from the hub to each mounting lug.

It is also contemplated that an injector includes a mounting flange and a feed arm extending from an inner surface of the mounting flange. A spray nozzle extends from an end of the feed arm opposite the mounting flange. The mounting flange includes at least one inlet fitting in fluid communication with one or more respective fluid passages through the feed arm. The spray nozzle is in fluid communication with the one or more respective fluid passages for issuing a spray of fluid supplied from the at least one inlet fitting. The mounting flange includes a first mounting lug with fastener bore therethrough that passes through the mounting flange. A first support beam extends along an outer surface of the mounting flange from the first mounting lug to a hub of the mounting flange, wherein the first support beam includes an outer surface spaced apart from the outer surface of the mounting flange and two opposed lateral surfaces each extending from the outer surface of the first support beam toward the outer surface of the mounting flange, wherein the support beam includes a stiffening beam extending from the lateral surfaces of the support beam to the outer surface of the mounting flange, and wherein the stiffening beam is wider than the width between the opposed lateral surfaces of the support beam for preventing over flexing the mounting flange.

A second mounting lug can be included with a fastener bore therethrough that passes through the mounting flange. A second support beam can extend along the outer surface of the mounting flange from the second mounting lug to the hub of the mounting flange. The second support beam can include an outer surface spaced apart from the outer surface of the mounting flange and two opposed lateral surfaces each extending from the outer surface of the second support beam toward the outer surface of the mounting flange, wherein the support beam includes a stiffening beam extending from the lateral surfaces of the support beam to the outer surface of the mounting flange, and wherein the stiffening beam is wider than the width between the opposed lateral surfaces of the support beam for preventing over flexing the mounting flange. The first and second lugs can be diametrically opposed to one another across the hub of the mounting flange.

An engine case can be mounted to the mounting flange by two fasteners fastened through the fastener bores of the first and second mounting lugs, wherein there is a pocket defined between the engine case and the inner surface of the mounting flange. A gasket can be seated in the pocket sealing between the inner surface of the mounting flange and the engine case. An injector shroud can extend through the engine case around the feed arm and can be captured in the pocket.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
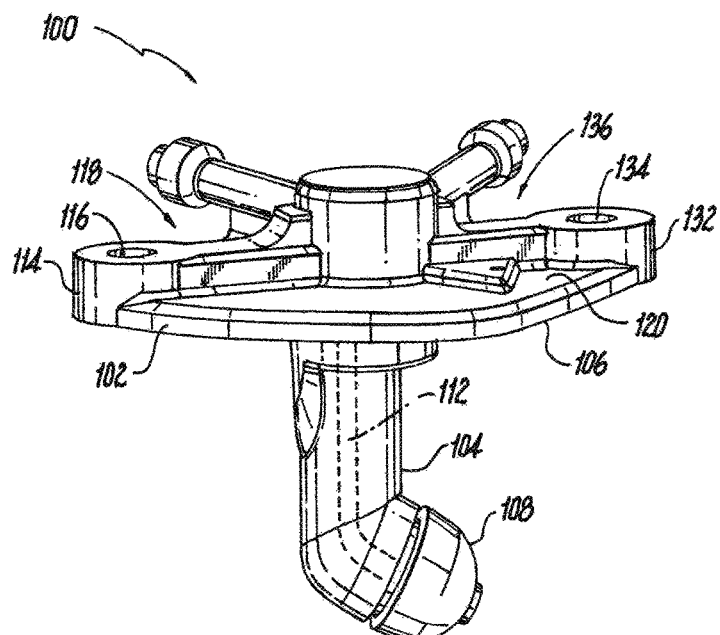
FIG. 1 is a perspective view of an exemplary embodiment of an injector constructed in accordance with the present disclosure, showing the mounting flange, feed arm, and nozzle.

Reference will now be made to the drawings wherein like reference numerals identify similar structural features or aspects of the subject disclosure. For purposes of explanation and illustration, and not limitation, a partial view of an exemplary embodiment of an injector in accordance with the disclosure is shown in FIG. 1 and is designated generally by reference character 100. Other embodiments of injectors in accordance with the disclosure, or aspects thereof, are provided in FIGS. 2-3, as will be described. The systems and methods described herein can be used to mitigate and/or eliminate failures of mounting flanges during installation of injectors and nozzles such as in gas turbine engines.

The injector 100 includes a mounting flange 102 and a feed arm 104 extending from an inner surface 106 of the mounting flange 102. A spray nozzle 108 extends from an end of the feed arm 104 opposite the mounting flange 102. The mounting flange 102 includes at least one inlet fitting 110, in the example shown in FIGS. 1-2, there are two inlet fittings 110 but any suitable number of inlet fittings can be used. The inlet fittings 110 are in fluid communication with one or more respective fluid passages 112 through the feed arm 104 as indicated schematically in FIG. 1 with the broken lines. The spray nozzle 108 is in fluid communication with the one or more respective fluid passages 112 for issuing a spray of fluid supplied from the inlet fitting or fittings 110.

Figure 2:
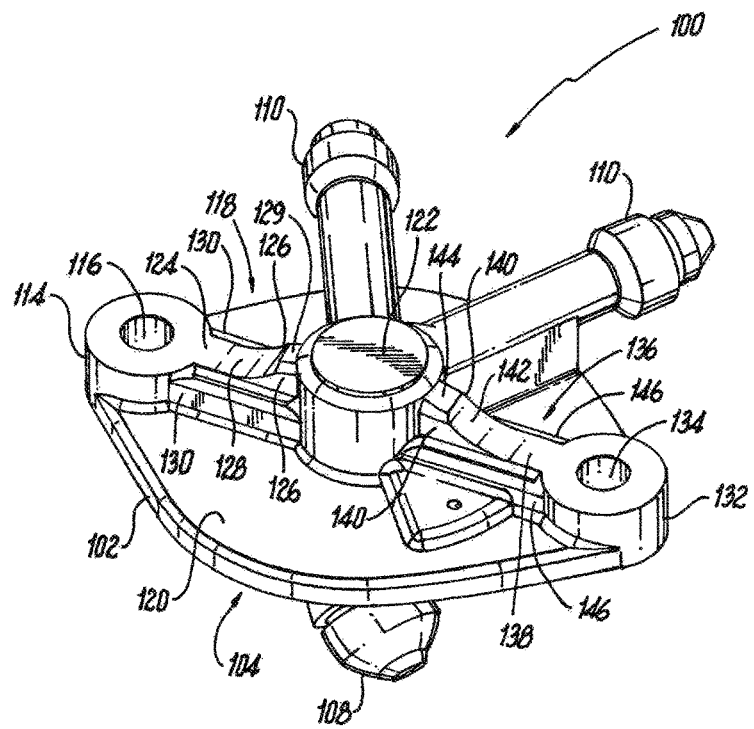
FIG. 2 is a perspective view of the injector of FIG. 1, showing the stiffening beams and the contours of the outer surfaces of the support beams.

With reference now to FIG. 2, the mounting flange 102 includes a first mounting lug 114 with a fastener bore 116 therethrough that passes through the mounting flange 102. A first support beam 118 extends along an outer surface 120 of the mounting flange 102 from the first mounting lug 114 to a hub 122 of the mounting flange 102. The first support beam 118 includes an outer surface 124 spaced apart from the outer surface 120 of the mounting flange 102 and two opposed lateral surfaces 126 each extending from the outer surface 124 of the first support beam 118 toward the outer surface 120 of the mounting flange 102. Inner and outer in this context are with respect to an engine case into which the injector 100 is mounted as described below. The outer surface 124 of the first support beam 118 includes a contour 128 with a blended radius that extends along a majority of the length from the first mounting lug 114 to the hub 122 for mitigating mechanical stresses at the first mounting lug 114. The contour 128 is tangent with an outer surface of the first mounting lug 114, e.g., the upper surface of the mounting lug 114 as oriented in FIGS. 1-2. The outer surface 124 of the first support beam 118 includes a flat portion 129 extending from the hub 122 to the contour 128. The contour 128 meets the flat portion 129 of the outer surface 124 of the support beam 118 at a non-tangential angle. Over 75% of the outer surface 124 of the support beam 118 is included in the contour 128, and under 25% of the outer surface 124 of the support beam 118 is included in the flat portion 129. Those skilled in the art will readily appreciate that other percentages can be used for the contour 128 and flat portion 129 without departing from the scope of this disclosure. The radius size for contour 128 can be chosen, iteratively as needed, until the stress prediction is shown to be acceptable for a specific application.

The support beam 118 includes a stiffening beam 130 extending, e.g., downward as oriented in FIGS. 1-2, from the lateral surfaces 126 of the support beam 118 to the outer surface 120 of the mounting flange 102. The stiffening beam 130 is wider than the width between the opposed lateral surfaces 126 of the support beam 118. The stiffening beam 130 can prevent the mounting flange 102 from over flexing, which could otherwise result in leakage at the gasket 154, which is described below.

A second mounting lug 132 includes a fastener bore 134 therethrough that passes through the mounting flange 102. A second support beam 136 extends along the outer surface 102 of the mounting flange 102 from the second mounting lug 132 to the hub 122. The second support beam 136 is similar to the first support beam 118 and includes an outer surface 138 spaced apart from the outer surface 120 of the mounting flange 102 and two opposed lateral surfaces 140 each extending from the outer surface 138 toward the outer surface 120 of the mounting flange 102. The outer surface 138 of the second support beam 136 includes a contour 142 with a blended radius for mitigating mechanical stresses at the second mounting lug 132. There is a flat portion 144 on the outer surface 138 of the second support beam 136, and the flat portion 144 and contour 142 are similar to those described above with respect to the first support beam 118. The second support beam 136 also includes a stiffening beam 146 similar to that described above with respect to the first stiffening beam 130. The first and second lugs 114 and 132 are diametrically opposed to one another across the hub 122 of the mounting flange 102.

Figure 3:
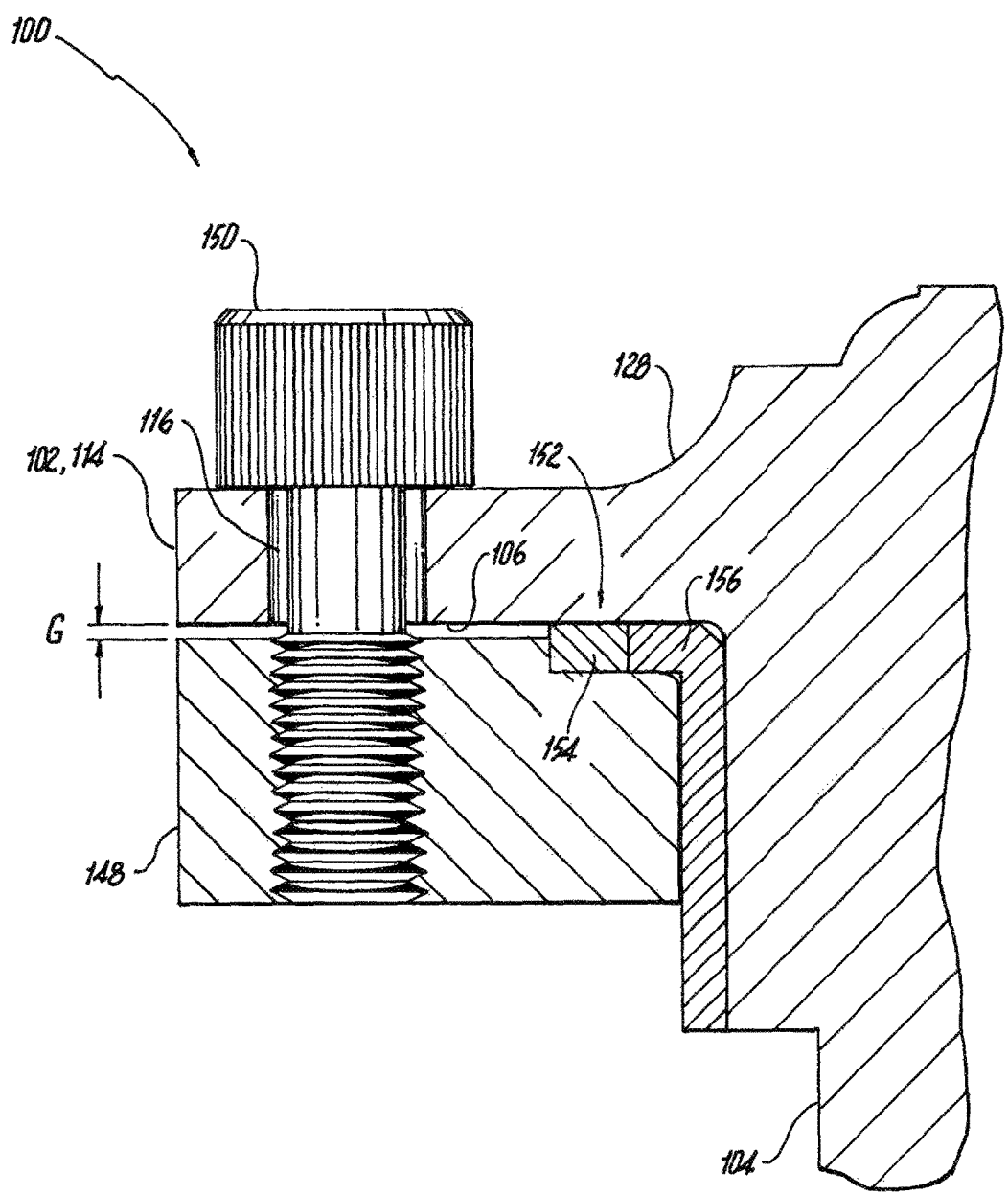
FIG. 3 is a cross-sectional side-elevation view of a portion of the injector of FIG. 1, showing a fastener mounting the injector to an engine case.

With reference now to FIG. 3, the mounting flange 102 can be mounted to an engine case 148 by two fasteners 150, only one of which is shown in FIG. 3 for sake of clarity, fastened through the fastener bores 116 and 134 of the first and second mounting lugs 114 and 132. There is a pocket 152 defined between the engine case 148 and the inner surface 106 of the mounting flange 102. A gasket 154 is seated in the pocket 152, sealing between the inner surface 106 of the mounting flange 102 and the engine case 148. An injector shroud 156 extends through the engine case 148 around the feed arm 104, captured in the pocket 152 between the mounting flange 102 and the engine case 148. The top surface of the injector shroud 156 is arranged to be initially below the top surface of the gasket 154 (as oriented in FIG. 3) so that the gasket 154 must be compressed in order to capture the injector shroud 156 in pocket 152.

Installing an injector 100 in an engine case 148 includes tightening the fastener 150 passing through each of the mounting lugs 114 and 132 of the mounting flange 102 to fasten the injector 100 to the engine case 148. This compresses the gasket 154 and the shroud 156 in the pocket 152 between the inner surface 106 of the mounting flange 102 and the engine case 148. Tightening the fastener 150 loads the mounting flange 102 without causing failure, e.g. at the mounting lugs 114 and 132, because the mounting flange 102 is supported by the support beams 118 and 136, which mitigate mechanical stresses at the mounting lug 114. Compressing the gasket 154 includes tightening two fasteners 150, e.g., by torqueing, into the two diametrically opposed mounting lugs 114 and 132, tightening the gap G between the inner surface 106 of the mounting flange 102 and the engine case 148. The blended radii of the contours 128 and 142 absorb stresses as the fasteners 150 are torqued, reducing the possibility of failure such as cracking at the mounting lugs 114 and 132. The stiffening beams 130 and 146 help prevent the flange 102 from deflecting and causing stresses when the fasteners 150 are torqued, also reducing the possibility of failure.

The methods and systems of the present disclosure, as described above and shown in the drawings, provide for mounting flange bending support with superior properties including reduced mechanical stresses. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An injector comprising:
a mounting flange;
a feed arm extending from an inner surface of the mounting flange; and
a spray nozzle extending from an end of the feed arm opposite the mounting flange, wherein the mounting flange includes at least one inlet fitting in fluid communication with one or more respective fluid passages through the feed arm, wherein the spray nozzle is in fluid communication with the one or more respective fluid passages for issuing a spray of fluid supplied from the at least one inlet fitting, and wherein the mounting flange includes:
a first mounting lug with a fastener bore therethrough that passes through the mounting flange;
a first support beam extending along an outer surface of the mounting flange from the first mounting lug to a hub of the mounting flange, wherein the first support beam includes an outer surface spaced apart from the outer surface of the mounting flange and two opposed lateral surfaces each extending from the outer surface of the first support beam toward the outer surface of the mounting flange, wherein the outer surface of the first support beam includes a contour with a blended radius that extends along a majority of the length from the first mounting lug to the hub for mitigating mechanical stresses at the first mounting lug;
a second mounting lug with a fastener bore therethrough that passes through the mounting flange;
a second support beam extending along the outer surface of the mounting flange from the second mounting lug to the hub of the mounting flange, wherein the second support beam includes an outer surface spaced apart from the outer surface of the mounting flange and two opposed lateral surfaces each extending from the outer surface of the second support beam toward the outer surface of the mounting flange, wherein the outer surface of the second support beam includes a contour with a blended radius for mitigating mechanical stresses at the second mounting lug;
an engine case mounted to the mounting flange by two fasteners fastened through the fastener bores of the first and second mounting lugs, wherein there is a pocket defined between the engine case and the inner surface of the mounting flange;
a gasket seated in the pocket sealing between the inner surface of the mounting flange and the engine case; and
an injector shroud extending through the engine case around the feed arm and captured in the pocket.

2. The injector as recited in claim 1, wherein the first and second lugs are diametrically opposed to one another across the hub of the mounting flange.

3. An injector comprising:
a mounting flange;
a feed arm extending from an inner surface of the mounting flange; and
a spray nozzle extending from an end of the feed arm opposite the mounting flange, wherein the mounting flange includes at least one inlet fitting in fluid communication with one or more respective fluid passages through the feed arm, wherein the spray nozzle is in fluid communication with the one or more respective fluid passages for issuing a spray of fluid supplied from the at least one inlet fitting, and wherein the mounting flange includes:
a first mounting lug with a fastener bore therethrough that passes through the mounting flange; and
a first support beam extending along an outer surface of the mounting flange from the first mounting lug to a hub of the mounting flange, wherein the first support beam includes an outer surface spaced apart from the outer surface of the mounting flange and two opposed lateral surfaces each extending from the outer surface of the first support beam toward the outer surface of the mounting flange, wherein the outer surface of the first support beam includes a contour with a blended radius that extends along a majority of the length from the first mounting lug to the hub for mitigating mechanical stresses at the first mounting lug, wherein the support beam includes a stiffening beam extending from the lateral surfaces of the support beam to the outer surface of the mounting flange, wherein the stiffening beam is wider than the width between the opposed lateral surfaces of the support beam.

4. An injector comprising:
a mounting flange;
a feed arm extending from an inner surface of the mounting flange; and
a spray nozzle extending from an end of the feed arm opposite the mounting flange, wherein the mounting flange includes at least one inlet fitting in fluid communication with one or more respective fluid passages through the feed arm, wherein the spray nozzle is in fluid communication with the one or more respective fluid passages for issuing a spray of fluid supplied from the at least one inlet fitting, and wherein the mounting flange includes:
a first mounting lug with a fastener bore therethrough that passes through the mounting flange; and
a first support beam extending along an outer surface of the mounting flange from the first mounting lug to a hub of the mounting flange, wherein the first support beam includes an outer surface spaced apart from the outer surface of the mounting flange and two opposed lateral surfaces each extending from the outer surface of the first support beam toward the outer surface of the mounting flange, wherein the outer surface of the first support beam includes a contour with a blended radius that extends along a majority of the length from the first mounting lug to the hub for mitigating mechanical stresses at the first mounting lug, wherein the contour of the outer surface of the first support beam is tangent with an outer surface of the first mounting lug.

5. The injector as recited in claim 4, wherein the contour meets a flat portion of the outer surface of the support beam at a non-tangential angle.

6. The injector as recited in claim 4, wherein over 75% of the outer surface of the support beam is included in the contour, and under 25% of the outer surface of the support beam is included in a flat portion.

7. An injector comprising:
a mounting flange;
a feed arm extending from an inner surface of the mounting flange; and
a spray nozzle extending from an end of the feed arm opposite the mounting flange, wherein the mounting flange includes at least one inlet fitting in fluid communication with one or more respective fluid passages through the feed arm, wherein the spray nozzle is in fluid communication with the one or more respective fluid passages for issuing a spray of fluid supplied from the at least one inlet fitting, and wherein the mounting flange includes:
a first mounting lug with a fastener bore therethrough that passes through the mounting flange; and
a first support beam extending along an outer surface of the mounting flange from the first mounting lug to a hub of the mounting flange, wherein the first support beam includes an outer surface spaced apart from the outer surface of the mounting flange and two opposed lateral surfaces each extending from the outer surface of the first support beam toward the outer surface of the mounting flange, wherein the support beam includes a stiffening beam extending from the lateral surfaces of the support beam to the outer surface of the mounting flange, wherein the stiffening beam is wider than the width between the opposed lateral surfaces of the support beam for preventing over flexing the mounting flange.

8. The injector as recited in claim 7, further comprising:
a second mounting lug with a fastener bore therethrough that passes through the mounting flange; and
a second support beam extending along the outer surface of the mounting flange from the second mounting lug to the hub of the mounting flange, wherein the second support beam includes an outer surface spaced apart from the outer surface of the mounting flange and two opposed lateral surfaces each extending from the outer surface of the second support beam toward the outer surface of the mounting flange, wherein the support beam includes a stiffening beam extending from the lateral surfaces of the support beam to the outer surface of the mounting flange, wherein the stiffening beam is wider than the width between the opposed lateral surfaces of the support beam for preventing over flexing the mounting flange.

9. The injector as recited in claim 8, wherein the first and second lugs are diametrically opposed to one another across the hub of the mounting flange.

10. The injector as recited in claim 8, further comprising:
an engine case mounted to the mounting flange by two fasteners fastened through the fastener bores of the first and second mounting lugs, wherein there is a pocket defined between the engine case and the inner surface of the mounting flange;
a gasket seated in the pocket sealing between the inner surface of the mounting flange and the engine case; and
an injector shroud extending through the engine case around the feed arm and captured in the pocket.

* * * * *